June 7, 1932.  G. W. EMRICK  1,862,352
TOOL ADAPTER
Filed Jan. 28, 1931
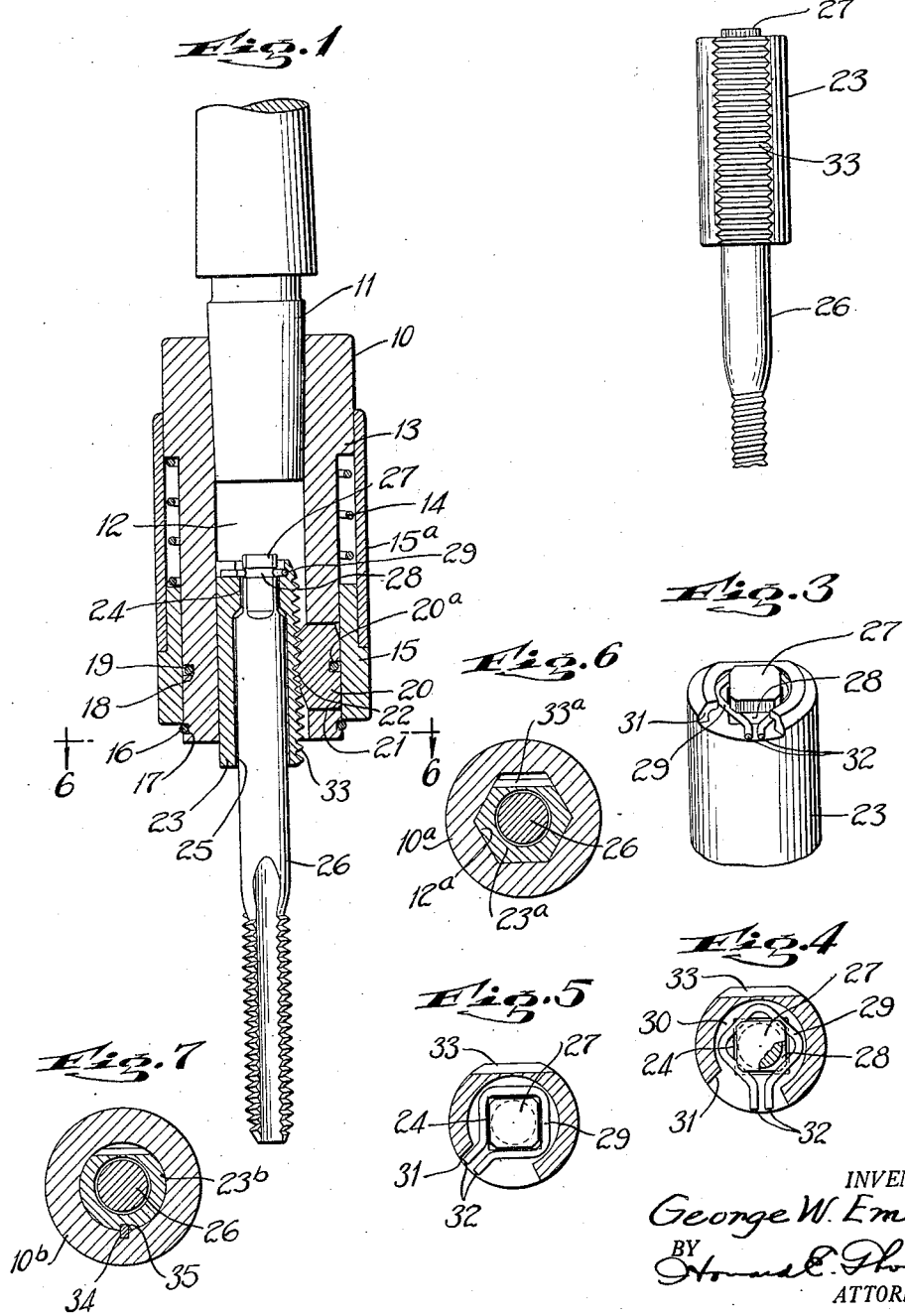
INVENTOR.
George W. Emrick.
BY Howard E. Thompson
ATTORNEY.

Patented June 7, 1932

1,862,352

UNITED STATES PATENT OFFICE

GEORGE W. EMRICK, OF BROOKLYN, NEW YORK

TOOL ADAPTER

Application filed January 28, 1931. Serial No. 511,780.

This invention relates to adapters for use in connection with taps, drills, reamers and similar tools to facilitate the coupling of such tools with a chuck device and the object of the invention is to provide an adapter of the class specified having means for quickly attaching and detaching the tool with respect thereto to prevent longitudinal movement of the tool with respect to the adapter; a further object being to provide means for keying the tool against rotation with respect to the adapter; a further object being to provide means spaced longitudinally of the adapter whereby the adapter may be adjustably supported with respect to a chuck body, said means being engaged by a dog or key member movably supported in the chuck body; a still further object being to provide means for coupling predetermined tools with an adapter in such manner as to permit a free, floating mounting of the tool within the adapter; and with these and other objects in view, the invention consists in a device of the class and for the purpose specified, which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:

Fig. 1 is a longitudinal, sectional view through a chuck device and a tool adapter illustrating a tool supported in connection therewith.

Fig. 2 is a side view of the adapter detached from the chuck and indicating a tool therein.

Fig. 3 is a perspective view of one end of the adapter showing the method of coupling a tool therewith.

Fig. 4 is a sectional, plan view of the structure shown in Fig. 3.

Fig. 5 is a view similar to Fig. 4 showing the tool retaining means of the adapter in a different position and the tool removed.

Fig. 6 is a section on the line 6—6 of Fig. 1, showing a modification; and,

Fig. 7 is a view similar to Fig. 6 showing another modification.

In Fig. 1 of the drawing, I have shown a sectional view of one form of chuck device of a novel construction, in connection with which my improved tool adapter is employed, said chuck device constituting the subject matter of a companion application field of equal date herewith. The chuck device illustrated comprises a chuck body 10, to one end of which is attached a spindle 11, the bore 12 of the chuck body opening through the lower end thereof facilitating the insertion of a tool and tool adapter therein. The lower end of the body 10 is reduced to form a shoulder 13 adjacent the upper end thereof, upon which a spring 14 seats, the other end of the spring seating upon a collar 15 movable longitudinally of the body 10. The collar 15 preferably includes a casing 15a enclosing the spring 14 and which fits upon the enlarged upper end portion of said body.

The collar 15 is retained against displacement on the body 10 by a split ring 16 seated in a ring groove 17 on the periphery of the body 10 adjacent the lower end thereof. Another ring groove 18 is formed in the periphery of the body 10 inwardly of the groove 17 and a spring ring 19 is arranged in this groove and cooperates with a dog or key member 20 mounted in a radial aperture 21 in the body 10. The ring 19 engages a groove 20a formed in the member 20. It is preferred that the outer surface of the member 20 be arc-shaped to conform with the contour of the body 10, and the inner surface of said member is provided with one or more inwardly projecting teeth 22 adapted to enter the bore 12.

In the accompanying drawing, I have shown at 23 one form of my improved adapter consisting of an elongated sleeve, the upper end of which terminates in a square bore 24, whereas the bore 25 extending from the bore 24 to the other end of the sleeve is preferably circular in form. When the adapter is employed on tool 26 such as a tap as illustrated in Fig. 1 of the drawing, it is also preferred that the diameter of the bore 25 be slightly larger than the diameter of the shank of the tap 26. The tool 26 terminates at its upper end in a square head 27, and this head has an annular groove 28 formed therein to receive a spring ring 29 seating in an annular groove 30 formed in the bore 24 of the sleeve 23. The upper end of said sleeve is notched or cut out as seen at 31 to register with the groove 30 so as to provide a circumferential channel in which radially projecting ends 32 of the ring 29 are adapted to operate.

The spring ring 29 is substantially square in form and is tensionally supported within the groove 30. The dimensions between opposed inner walls of the ring will correspond to the dimensions of opposed walls of the bore 24 so that the square head 27 of the tool 26 may be passed through the ring 29 when in the position shown in Fig. 5 of the drawing. By turning said ring, with a suitable tool engaging the radial projections 32, into the position shown in Fig. 4, it will be apparent that the straight sides of the ring 29 will transverse the corner portions of the square head to key and lock the tool 26 against displacement from the adapter or sleeve 23. With this construction, it will be apparent that the tool 26 may be quickly and easily attached and detached with respect to the adapter whenever desired, it being understood that one adapter may be used for supporting any number of tools in the operation of replacing new tools for worn out or broken tools.

Spaced longitudinally of the outer wall of the sleeve 23 is a plurality of teeth or projections 33 in connection with which the tooth or projection 22 or a plurality of such teeth on the member 20 is adapted to operate to retain the sleeve 23 as well as the tool 26 in different positions of adjustment with respect to the chuck body 10.

The attachment and detachment of the tool and adapter with the chuck body is accomplished by raising the collar 15 on the chuck body against the action of the spring 14 sufficiently to clear the member 20, after which the tool with the adapter thereon is inserted into the bore 12 and adjusted to the desired position, in which operation the member 20 is moved outwardly or radially against the action of the spring 19. When the tool is in properly adjusted position, the collar is released to enclose the member 20 and to securely lock and key the tool and adapter against displacement with respect to the chuck body. In some cases, the tool will be supported firmly in the adapter, but in mounting taps therein, it is preferred that clearance be provided between the shank of the tap and the bore 25 facilitating the universal floating support of the tap within the adapter in order that the tap may find its own free center in the workpiece.

In Fig. 6 of the drawing, I have shown a slight modification wherein the body 10a of the chuck is provided with a bore 12a which is angular in cross sectional form, being hexagonal in the structure disclosed; and the adapter sleeve 23a is of corresponding cross sectional form to fit snugly in the bore 12a of the body 10a so as to key the parts together. One flat side of the sleeve 23 will have the longitudinally spaced teeth or projections 33a.

In Fig. 7, I have shown another modification wherein the body 10b is provided with an elongated key 34 operating in a key groove 35 formed in one wall of the sleeve 23b to key said sleeve against rotation in the body. While the member 20 as shown in Fig. 1 of the drawing serves as a key operating upon the flat side of the sleeve 23, the structures shown in Figs. 6 and 7 may be desirable especially with chucks for heavy tools performing heavy work where it would be desirable to relieve the stress or strain upon the member 20.

It will be understood that my invention is not necessarily limited to the specific structure of the adapter herein shown and described, nor am I necessarily limited to the specific structure of the chuck housing disclosed; and various other changes in and modifications of the structure herein shown and described may be made within the scope of the appended claims without departing from the spirit of my invention or sacrificing its advantages.

Having fully described my invention, what I claim as new and desire to secure by Letters Patent, is:

1. An adapter of the class described comprising a tubular body having a bore at one end thereof which is angular in cross sectional form and adapted to receive the angular shank of a tool mounted therein to key the tool against rotary movement with respect thereto, and other means arranged in the angular bore of the adapter cooperating with a tool supported therein to key the tool against longitudinal movement with respect thereto.

2. An adapter of the class described comprising a tubular body having a bore at one end thereof which is angular in cross sectional form and adapted to receive the angular shank of a tool mounted therein to key the tool against rotary movement with respect thereto, and other means arranged in the angular bore of the adapter cooperating with a tool supported therein to key the tool against longitudinal movement with respect thereto, said last named means comprising a rotatably adjustable ring.

3. An adapter of the class described comprising a tubular body having a bore at one end thereof which is angular in cross sectional form and adapted to receive the angular shank of a tool mounted therein to key the tool against rotary movement with respect thereto, and other means on the adapter cooperating with a tool supported therein to key the tool against longitudinal movement with respect thereto, said last named means comprising a rotatably adjustable ring of angular form to permit the passage of the angular shank of the tool therethrough.

4. An adapter of the class described comprising a tubular body having a bore at one end thereof which is angular in cross sectional form and adapted to receive the angular shank of a tool mounted therein to key the tool against rotary movement with respect thereto, other means on the adapter cooperating with a tool supported therein to key the tool against longitudinal movement with respect thereto, said last named means comprising a rotatably adjustable ring of angular form to permit the passage of the angular shank of the tool therethrough, and said ring including a radially extending finger by means of which the same may be rotated.

5. An adapter of the class described comprising an elongated tubular body having a square bore at one end thereof and a cylindrical bore at the other end, an annular groove formed in the square bore, and a substantially square spring ring tensionally supported within said groove and adjustable circumferentially thereof to arrange opposed substantially parallel walls of the spring in different positions circumferentially with respect to said groove.

6. An adapter of the class described comprising an elongated tubular body having a square bore at one end thereof and a cylindrical bore at the other end, an annular groove formed in the square bore, and a substantially square spring ring tensionally supported within said groove and adjustable circumferentially thereof to arrange opposed substantially parallel walls of the spring in different positions circumferentially with respect to said groove, said spring including a radially projecting portion operating in a notch formed in said adapter and by means of which said spring may be adjusted.

7. An adapter of the class described comprising an elongated tubular body having a square bore at one end thereof and a cylindrical bore at the other end, an annular groove formed in the square bore and a substantially square spring ring tensionally supported within said groove and adjustable circumferentially thereof to arrange opposed substantially parallel walls of the spring in different positions circumferentially with respect to said groove, said spring including a radially projecting portion operating in a notch formed in said adapter and by means of which said spring may be adjusted, and the inside dimensions of said spring corresponding to that of said square bore.

8. An adapter of the class described comprising an elongated tubular body having a square bore at one end thereof and a cylindrical bore at the other end, an annular groove formed in the square bore, a substantially square spring ring tensionally supported within said groove and adjustable circumferentially thereof to arrange opposed substantially parallel walls of the spring in different positions circumferentially with respect to said groove, the square end of said tubular body having a circumferential notch and said spring including a radially projecting portion operating in said notch and engaging the end walls of the notch to limit the circumferential movement of the spring in both directions.

9. The combination with the shank portion of a tool of the class described, of an adapter for mounting the tool in connection with a chuck, means adjustably supported in the adapter and cooperating with said tool for keying the tool against movement with respect thereto, said means involving a member rotatably adjustable in the adapter, and means for limiting the movement of the first named means in both directions.

10. An adapter for supporting tools of the class described in connection with a chuck, said adapter comprising an elongated tubular body having a cylindrical bore throughout the major portion of its length terminating at one end in an angular bore adapted to receive the angular shank of a tool in keying the tool against rotation with respect to the adapter, the cylindrical bore of said adapter being of greater diameter than the diameter of the tool arranged therein to provide a floating movement of the tool in said adapter, and means for keying the tool against longitudinal movement with respect to said adapter.

11. An adapter for supporting tools of the class described in connection with a chuck, said adapter comprising an elongated tubular body having a cylindrical bore throughout the major portion of its length terminating at one end in an angular bore adapted to receive the angular shank of a tool in keying the tool against rotation with respect to the adapter, the cylindrical bore of said adapter being of greater diameter than the diameter of the tool arranged therein to provide a floating movement of the tool in said adapter, means for keying the tool against longitudinal movement with respect to said adapter, and means on said adapter whereby the same may be adjustably supported in connection with a chuck.

12. An adapter for supporting tools of the class described in connection with a chuck, said adapter comprising an elongated tubular body, means for detachably supporting a tool in connection with the adapter, and a plurality of teeth arranged in close proximity to each other longitudinally of the outer wall of the adapter for providing relatively fine adjustment of the adapter in connection with a chuck, and for keying the adapter thereto.

13. An adapter for supporting tools of the class described in connection with a chuck, said adapter comprising an elongated tubular body, means for detachably supporting a tool in connection with the adapter including a spring ring adjustably supported in the inner end of the adapter and adapted in one position thereof to engage and key the inner end of the tool against longitudinal movement with respect to said adapter, and a plurality of teeth arranged in close proximity to each other longitudinally of the outer wall of the adapter for providing relatively fine adjustment of the adapter in connection with a chuck and for keying the adapter thereto.

14. An adapter for supporting tools of the class described in connection with a chuck, said adapter comprising an elongated, tubular body, means for detachably supporting a tool in connection with the adapter including a spring ring adjustably supported in the inner end of the adapter and adapted in one position thereof to engage and key the inner end of the tool against longitudinal movement with respect to said adapter, a plurality of teeth arranged in close proximity to each other longitudinally of the outer wall of the adapter for providing relatively fine adjustment of the adapter in connection with a chuck and for keying the adapter thereto, and other means adjacent said spring ring for keying the tool against rotary movement with respect to the adapter.

In testimony that I claim the foregoing as my invention I have signed my name this 22nd day of January, 1931.

GEORGE W. EMRICK.